J. A. GUNN.
SEAT INDICATOR.
APPLICATION FILED APR. 27, 1915.
1,241,965.
Patented Oct. 2, 1917.
2 SHEETS—SHEET 1.
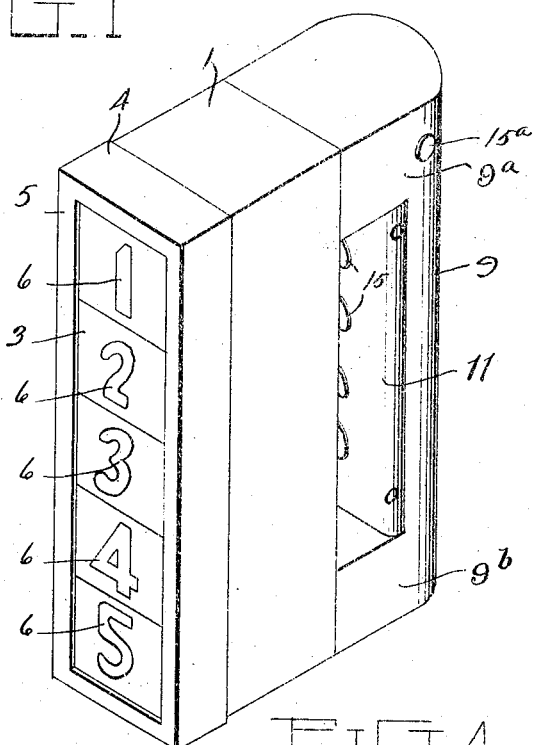
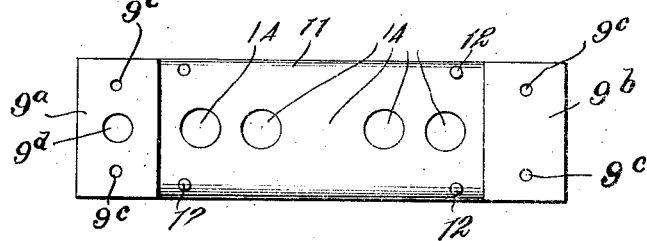
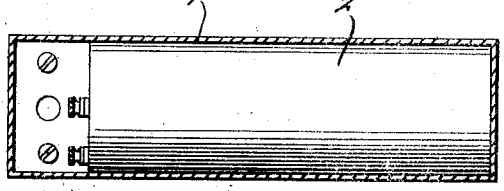
Witnesses
Chas. H. Trotter
Inventor
J. A. Gunn J. A. GUNN.
SEAT INDICATOR.
APPLICATION FILED APR. 27, 1915.
1,241,965.
Patented Oct. 2, 1917.
2 SHEETS—SHEET 2.
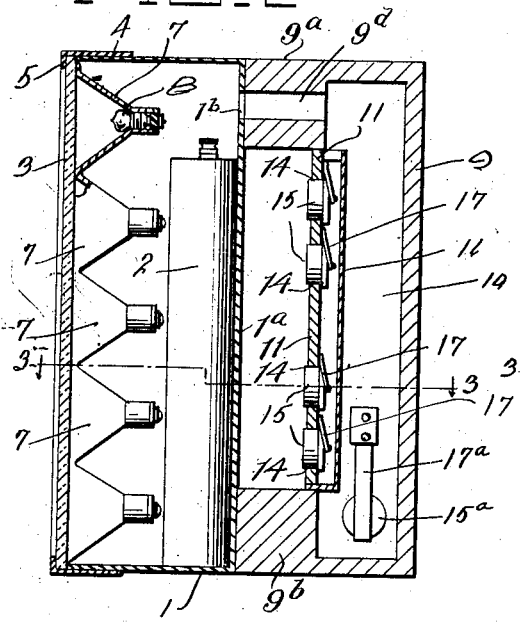
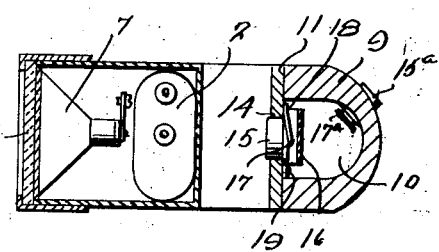
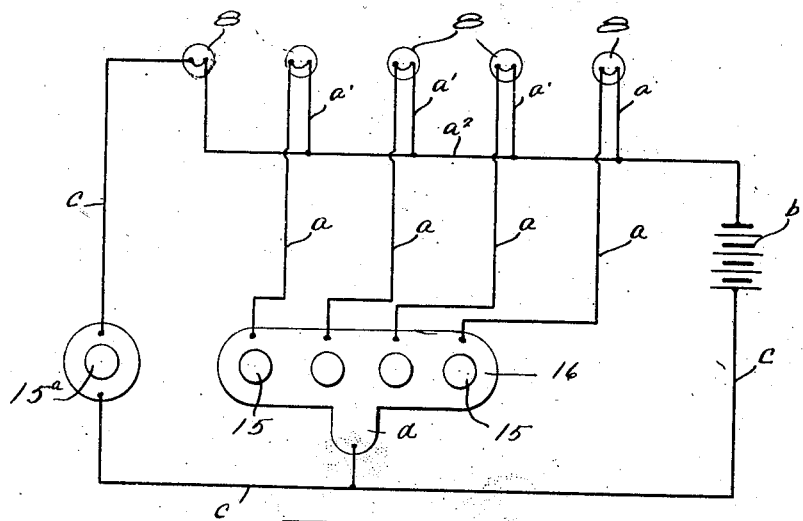
Witnesses
Chas. H. Troller
T. P. Bunger
Inventor
J. A. Gunn
By
Attorney

UNITED STATES PATENT OFFICE.

JOHN A. GUNN, OF HOPKINSVILLE, KENTUCKY.

SEAT-INDICATOR.

1,241,965.  Specification of Letters Patent.  Patented Oct. 2, 1917.

Application filed April 27, 1915. Serial No. 24,255.

*To all whom it may concern:*

Be it known that I, JOHN A. GUNN, a citizen of the United States, residing at Hopkinsville, in the county of Christian and State of Kentucky, have invented certain new and useful Improvements in Seat-Indicators; and I do hereby declare the following to be a full, clear, and exact description of the invention, such as will enable others skilled in the art to which it appertains to make and use the same.

This invention relates to seat indicators, designed for the purpose of indicating the location and number of seats which are vacant in a moving picture theater.

The usual method of seating patrons in a moving picture theater results in a great deal of confusion to the waiting patrons and the usual process is carried out by an usher passing down the aisles to locate the seats and then passing back to the waiting patrons to indicate the location and number of vacant seats.

Owing to the fact that the theater is dark or just sufficiently light to locate the seats, this procedure is very inconvenient for the patrons.

The principal object of the present invention is to provide a device which is to be used by an usher in passing down the aisle and indicating the location, and the number of seats vacant to the patrons waiting at the front of the auditorium.

The foregoing objects and advantages may be attained by means of the construction illustrated in the accompanying drawings, in which—

Figure 1 is a perspective view of a seat indicator or flasher made in accordance with this invention, Fig. 2 is a vertical sectional view taken longitudinally through the indicator.

Fig. 3 is a horizontal sectional view through the same,

Fig. 4 is another side view of the handle member,

Fig. 5 is a sectional view through the casing, and

Fig. 6 is a diagrammatic view of the electrical connection.

Referring to the drawings, the numeral 1 designates a metallic casing of suitable size for the purpose of containing the electric light bulbs and reflectors. The casing 1 contains a battery 2 of suitable type, and a glass window 3 is connected to the casing by means of a flanged member 4. The flange 5 of the member 4 holds the glass 3 in place, and said glass may be of the magnifying type, in order to give a strong flash. The glass 3 may be provided with different colored ordinals 6, said ordinals consisting of the numerals 1, 2, 3, 4 and 5. It will be understood that different and more ordinals may be used if desired. Arranged within the casing 1 in alinement with each of the ordinals 6 is a reflector 7 of suitable type, and connected at the apex or smaller end of each of the reflectors 7 is a small electric light bulb 8.

Connected to the casing 1 is a handle member 9, said handle member having a hollow chamber 10 therein. At its upper and lower end the handle 9 is provided with inwardly extending members $9^a$ and $9^b$ which space it from the rear wall $1^a$ of the casing 1. The handle 9 and the members $9^a$ and $9^b$ are provided with openings $9^c$ through which pass the means by which the handle is secured to the rear wall $1^a$. The chamber 10 is closed at its inner side by means of a suitable cover 11 secured to the handle member by means of screws or bolts 12. The cover 11 has a series of apertures 14 therein for the press buttons 15. A contact plate 16 is disposed in the chamber 10 and spaced slightly from the buttons 15, and press buttons are each provided with a contact point 17 disposed in alinement therewith, said contact points being formed upon a resilient plate 18, and said plate being secured at one of its edges by means of fasteners 19 to the cover member 11. When the buttons 15 is pressed, and the contact point 17 is forced against the plate 16, an electric connection is completed which lights the bulb in alinement with the button, and after the bulb has been ignited and the finger is removed from the button 15, the plate 18 returns to its normal position and disconnects the contact point 17 from the plate 16. A press button $15^a$ is connected to the handle member 9 and a suitable contact for said button is indicated by the numeral $17^a$ within the chamber 10. Electrical conductors lead from the plate 16 to the bulb 8, said conductors $a$ being connected to the battery $b$ through the conductors $a'$ and the conductor $a^2$. A conductor $c$ leads from the battery to the lug $d$ on the plate 16 and from thence to the button $15^a$ and from thence to one of the buttons 8. The conductors $a$ pass from the bulbs 8 to the chamber 10 through an opening 1$^b$ in the rear wall 1$^a$ of the casing 1 and through an opening 9$^d$ in the member 9$^a$. The wires $a$ are then connected to the contact points 17. The wires $c$ also pass through the openings 1$^b$ and 9$^d$ and are connected to the contacts 17$^a$ and the plate 16.

The manner of using the indicator may be briefly described as follows: The usher takes the indicator in his hand and goes down the aisle in search of vacant seats. If he finds three seats vacant and connected together, he presses upon the button which flashes the bulb in alinement with the figure 3 on the glass. He then makes a search for other seats and flashes out to the waiting patrons the number of seats which are vacant and connecting, and in this way he is not required to pass back to the patrons.

Various changes may be made in the details of construction without departing from the spirit and scope of the invention as defined in the claims.

What is claimed is:—

1. A seat indicator comprising a casing containing a battery, a plurality of reflectors carrying electric light bulbs, a glass in the casing, said glass having a series of ordinals thereon in alinement with each electric light bulb, a handle, and buttons connected to the handle for flashing the bulbs, and electrical connections between said buttons and bulbs.

2. An indicator for the location and number of seats in the moving picture theater comprising a casing, a battery in the casing, a series of reflectors in the casing, each reflector having an electric light bulb disposed therein, a magnifying glass before each reflector, a number indicated on said magnifying glass, a handle member, a series of buttons mounted in the inner portion of said handle, and electrical connections between said buttons and bulbs and means for moving the buttons to close the circuit.

3. An electric flasher for indicating the number of seats vacant in a picture theater comprising a casing, a battery mounted in the casing, a series of reflectors in the casing, electric light bulbs connected one to each reflector, a glass before each bulb having a number thereon, a handle member, a contact plate in the handle member, a series of buttons mounted in the handle, a spring contact plate arranged adjacent said buttons, and electrical connections from said buttons to said bulb through a battery.

4. An electric indicator for the purpose described comprising a casing and electric light bulbs, a glass, numbers on the glass in alinement with the bulbs, a handle member secured to the casing, and means for lighting any one of the bulbs.

5. A portable seat indicator comprising a handle, a panel carried by the handle, a plurality of ordinals on the panel, and means by which any one of said ordinals may be illuminated, said means being carried by the handle.

6. A portable seat indicator comprising a handle, a panel carried by the handle, a plurality of ordinals on the panel, and means by which one or more of said ordinals may be illuminated, said means being carried by the handle.

7. A hand annunciator comprising a casing having a series of windows arranged alongside each other, a sheet of transparent material provided with identifying means covering the window, an electric light behind each window, a handle, push buttons on the handle, and a source of electrical energy carried by the casing, the lights and the buttons being adapted to be connected to the source to permit any predetermined light to be connected to the source by means of the push buttons.

8. A device of the character described comprising a casing of a form to be conveniently held in the hand, a series of electric signal lamps carried by said casing, an electric circuit including said lamps, and a series of push buttons for controlling the circuit to energize the lamps.

In testimony whereof I affix my signature in presence of two witnesses.

JOHN A. GUNN.

Witnesses:
 IRA L. SMITH,
 JNO. B. TRICE.